(12) United States Patent
Munoz Delgado

(10) Patent No.: US 12,148,135 B2
(45) Date of Patent: Nov. 19, 2024

(54) DETERMINATION OF THE DECISION-RELEVANT IMAGE COMPONENTS FOR AN IMAGE CLASSIFIER USING BINARY MASKS

(71) Applicant: Robert Bosch GmbH, Stuttgart (DE)

(72) Inventor: Andres Mauricio Munoz Delgado, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 398 days.

(21) Appl. No.: 17/643,476

(22) Filed: Dec. 9, 2021

(65) Prior Publication Data

US 2022/0189006 A1 Jun. 16, 2022

(30) Foreign Application Priority Data

Dec. 14, 2020 (DE) ...................... 10 2020 215 814.2

(51) Int. Cl.
*G06T 7/00* (2017.01)
*G06V 10/776* (2022.01)

(52) U.S. Cl.
CPC .......... *G06T 7/0002* (2013.01); *G06V 10/776* (2022.01)

(58) Field of Classification Search
CPC ............................. G06T 7/0002; G06V 10/776
See application file for complete search history.

(56) References Cited

U.S. PATENT DOCUMENTS 8,315,465 B1 * 11/2012 Baluja ................. G06F 18/2148
382/176

FOREIGN PATENT DOCUMENTS

WO 2018197074 A1 11/2018

OTHER PUBLICATIONS

Chang, et al.: "Explaining Image Classifiers by Counterfactual Generation," arXiv:1807 08024, (2019), ICLR 2019 conference paper, pp. 1-19.
Muddamsetty, et al.: "SIDU: Similarity Difference and Uniqueness Method for Explainable AI," 2020 IEEE International Conference on Image Processing (ICIP), pp. 1-6.
Petsiuk, et al.: "RISE: Randomized Input Sampling for Explanation of Black-box Models," arXiv.1806.07421v3, (2018), pp. 1-17.

* cited by examiner

*Primary Examiner* — David F Dunphy
(74) *Attorney, Agent, or Firm* — NORTON ROSE FULBRIGHT US LLP; Gerard A. Messina

(57) ABSTRACT

A method for measuring the components of an input image on which an image classifier bases its decision regarding the assignment of this input image to one or multiple class(es) of a predefined classification. The method includes: providing binary masks, which indicate which pixels of the input image and/or of an intermediate product formed in the image classifier are considered relevant; assessing the binary masks using a quality function, which is a measure of the extent to which at least one classification score, supplied by the image classifier, with respect to at least one target class changes when the pixels of the input image or of the intermediate product which are relevant according to the binary mask are changed; and ascertaining the sought-after components of the input image relevant for the decision of the image classifier from the combination of the binary masks with respective assessments by the quality function.

18 Claims, 2 Drawing Sheets

DETERMINATION OF THE DECISION-RELEVANT IMAGE COMPONENTS FOR AN IMAGE CLASSIFIER USING BINARY MASKS

The present invention relates to the check of the behavior of trainable image classifiers which may be used, for example, for the quality control of series-manufactured products or also for the at least semi-automated driving of vehicles.

BACKGROUND INFORMATION

During the series manufacture of products, it is generally necessary to continuously check the quality of the manufacture. In the process, it is sought to detect quality problems as quickly as possible to be able to eliminate the cause as soon as possible and not lose too many units of the particular product as scrap.

The visual inspection of the geometry and/or surface of a product is fast and non-destructive. PCT Patent Application No. WO 2018/197 074 A1 describes a testing device in which an object may be exposed to a plurality of illumination situations, images of the object being recorded with the aid of a camera in each of these illumination situations. From these images, the topography of the object is evaluated.

Images of the product may also be directly assigned to one of multiple classes of a predefined classification based on artificial neural networks using an image classifier. Based thereon, the product may be assigned to one of multiple predefined quality classes. In the simplest case, this classification is binary ("OK"/"not OK").

Trainable image classifiers are also used during the at least semi-automated driving of vehicles to assess traffic situations or at least analyze them for their content of objects.

SUMMARY

The present invention provides a method for measuring the components of an input image on which an image classifier bases its decision about the assignment of this input image.

In accordance with an example embodiment of the present invention, the method begins with binary masks being provided, which indicate which pixels of the input image and/or of an intermediate product formed in the image classifier are considered relevant. The binary masks may be drawn from a random distribution, for example.

The binary masks are assessed using a quality function, which is a measure of the extent to which at least one classification score, supplied by the image classifier, with respect to at least one target class changes when the pixels of the input image or of the intermediate product which are relevant according to the particular binary mask are changed.

The sought-after components of the input image relevant for the decision of the image classifier are ascertained from the combination of the binary masks with their respective assessments by the quality function. If the binary masks act on an intermediate product of the image classifier, and the combination of multiple such masks with their assessments thus initially results in a decision-relevant component of the intermediate product, this component may, in particular, be converted into the sought-after decision-relevant component of the input image, for example by interpolation or other upsampling.

The assessment using the quality function, in particular, allows multiple, for example randomly drawn, binary masks to be aggregated in a meaningful manner to the sought-after components of the input image or of the intermediate product relevant for the decision of the image classifier. In this way, for example, a sum of binary masks, which are each weighted with the assessments of these binary masks by the quality function, may be ascertained as a decision-relevant component of the input image or of the intermediate product. This means that even binary masks having modest or poor assessments by the quality function do not simply have to be discarded, but all examined masks in total may be incorporated into the final result which is ultimately formed. Finally, the aggregation across a number of randomly drawn binary masks also causes a portion of the randomness in the masks to be averaged out again.

In addition, in accordance with an example embodiment of the present invention, it is possible, through the special design of the quality function, to take the fact that one and the same change of pixels may have a very different effect, depending on the situation, more closely into consideration. When, for example, pixel values are set to zero or another constant value, it is not guaranteed that in this way only information from the input image or from the intermediate product is removed. Rather, a contrary effect may also occur, i.e., new information may be introduced. For example, setting a pixel to zero in the input image may introduce additional gradient information into the input image. When, in an intermediate product, a certain pixel represents the feature that a certain image area has low intensity values, the setting to zero also does not remove any information from the intermediate product. Rather, this information is only modified to the effect that the intensity values of the particular image area are now no longer low, but high.

The exact consideration of these effects ultimately makes it possible to provide information about the decision-relevant components of the input image based on a comparatively low number of binary masks. In this way, the information is overall quickly obtainable.

Furthermore, the assessment of binary masks using the quality function also does not necessarily require the input image or the intermediate product to be subjected, on a trial basis, to a specific predefined perturbation in the pixels determined by the mask. As is shown hereafter, the sensitivity of the classification score to changes in the input image or the intermediate product may also be ascertained by infinitesimal calculus.

In one particularly advantageous embodiment of the present invention, an intermediate product is selected which resulted from the input image due to processing in one or multiple convolutional layer(s). Such an intermediate product is considerably reduced in its dimensionality compared to the input image. In this way, the search space for binary masks via such intermediate products is also considerably smaller than the search space for binary masks via the input image. Accordingly, only a lower number of binary masks is necessary to arrive at the sought-after information about the decision-relevant areas. For example, the intermediate product may encompass a plurality of feature maps, which were each generated by the application of filter cores to the input image or to an intermediate product that was previously generated from the input image.

In accordance with an example embodiment of the present invention, particularly advantageously, an intermediate product is selected which is mapped on the at least one classification score in the image classifier by a classifier layer. As a result, the intermediate product is then not further convoluted before it is supplied to the classifier layer. The classifier layer may, in particular, be a fully linked layer, for example. When the analyzed intermediate product is supplied directly to the classifier layer, the effect of changes of this intermediate product is best quantitatively analyzed and introduced into an assessment by the quality function. Furthermore, the processing path, which changes of the intermediate product still have to pass through within the image classifier, is then the shortest. If, in contrast, an intermediate product is selected which is first supplied to further convolutional layers, and then to the classifier layer, the spatial resolution of this intermediate product is improved.

The terms "convolutional layer" and "classifier layer" may, in particular, refer to layers, for example, into which the neural networks used as image classifiers are divided. However, other types of image classifiers may also be organized in such layers.

In one particularly advantageous embodiment of the present invention, a strong dependence of the at least one classification score on pixels of the input image or of the intermediate product, which according to the binary mask are relevant, has an improving effect on the value of the quality function. This means that changes of these pixels are particularly suitable for changing the classification of the input image, for example, from the class to which it was originally assigned by the image classifier to one or multiple other class(es). For example, an image, recorded within the scope of quality control, of a product which, due to a defect or damage of this product, has been classified into the class "not OK=NOK," may be classified into the class "OK" when, due to a change in the input image, precisely this defect or damage is no longer discernible.

In the process, a strong dependence of the at least one classification score on pixels of the input image or of the intermediate product, which according to the binary mask are not relevant, advantageously has a worsening effect on the value of the quality function. The dependence of the classification score on these pixels may be considered to be a kind of "background." The greater the force of the area which is not relevant according to the binary mask for changing the classification scores (for the better or for the worse), the more the force of the areas which are relevant according to the binary mask for changing the classification scores is "watered down." This dependence of the classification score on the pixels which are not relevant according to the binary mask should therefore have a worsening effect on the value of the quality function. The value of the quality function is thus given the nature of a signal to noise ratio.

Similarly, at least one derivative and/or one gradient of the at least one classification score with respect to the pixels of the input image or of the intermediate product which are relevant according to the binary mask may advantageously have an improving effect on the value of the quality function. This applies regardless of whether a change of these relevant pixels causes an improvement or a worsening of the quality function. The only important aspect is the force of the area which is relevant according to the binary mask for changing the classification scores (for the better or for the worse). This force should therefore be assessed as an improvement by the quality function. In the process, a derivative and/or a gradient of the at least one classification score with respect to the pixels of the input image or of the intermediate product which are not relevant according to the binary mask may then have a worsening effect on the value of the quality function. If the analyzed intermediate product is made up of multiple feature maps, in particular, for example, the contributions of multiple of these feature maps may be added up during the formation of the derivative or the gradient.

It shall be assumed, for example, that L is an intermediate product which the image classifier generated from an input image I and which is made up of a plurality of feature maps $L_j$. It shall be assumed that m is a binary mask in which a pixel value of 1 means that the pixel of intermediate product L corresponding thereto is relevant, while a pixel value of 0 means that the pixel of intermediate product L corresponding thereto is not relevant. It shall be assumed that f is the classification score supplied by the image classifier. An exemplary quality function $R_{I,f}(m)$ may then be described as $$R_{I,f}(m) = \sum_j \frac{\Sigma\left|\left(\frac{d(f)}{dL_j} \odot m\right)\right|}{\Sigma\ m} - \frac{\Sigma\left|\left(\frac{d(f)}{dL_j} \odot (1-m)\right)\right|}{\Sigma\ (1-m)}.$$

Here, index j runs across all feature maps $L_j$. The greater the gradient intensity in the area of intermediate product L which is relevant according to binary mask m, and the lower this gradient intensity is at the same time in the area of intermediate product L which is not relevant according to binary mask m, the higher, and thus the better, is the value of quality function $R_{I,f}(m)$.

In quality function $R_{I,f}(m)$, the difference in the outer sum may optionally be cut off at 0 if it were negative otherwise. The gradients with respect to $L_j$ may be simple gradients, but also, for example, processing products of gradients which are obtained, for example, by smoothing or averaging across multiple slightly noisy versions of intermediate product L. It is also possible, for example, to select only such contributions to the inner sums for which the respective gradients have the same sign (positive or negative).

Furthermore, the contributions of feature maps $L_j$ may be combined to the value of quality function $R_{I,f}(m)$ not only by summation, but also in another manner. For example, the mean value or also the maximum of these contributions may be used. The latter is motivated by the fact that even the output of a single filter may indicate a strong detection of a decision-relevant feature, so that the mask then deserves a good assessment by quality function $R_{I,f}(m)$.

Advantageously, in accordance with an example embodiment of the present invention, at least one gradient remains unconsidered in response to its absolute value being below a predefined threshold. In this way, it may be taken into consideration that a gradient actually measures infinitesimal changes in the classification score, so that a direction may only be ascertained very imprecisely from gradients having a small value.

Advantageously, at least one gradient and/or at least one contribution of a pixel to such a gradient is discretized in that it, in response to being above a predefined threshold, is set to a first value and in that it, in response to being below the negated predefined threshold, is set to a second value. In this way, only the direction is extracted from the gradient, while its size, which may be imprecise, is discarded.

For an arbitrary pixel λ, gradient (d(f)/dL) (λ) may thus be replaced in the further processing chain, for example, with a discretized version $G_L(\lambda)$, which is given by $$G_L(\lambda) = 0 \text{ when } \left|\frac{d(f)}{dL}(\lambda)\right| < t,$$

$$G_L(\lambda) = 1 \text{ when } \frac{d(f)}{dL}(\lambda) > t,$$

$$G_L(\lambda) = -1 \text{ when } \frac{d(f)}{dL}(\lambda) < -t$$

with a threshold value t.

In one further advantageous embodiment of the present invention, the quality function includes at least one classification score which is supplied by the image classifier when the input image or the intermediate product is changed for the pixels which are relevant according to the binary mask to the effect that, in response to a contribution of a pixel to the gradient of the classification score with respect to the relevant pixels being above a predefined threshold, this pixel is changed to a first predefined substitute value $L_{max}$, and in response to a contribution of a pixel to the gradient of the classification score with respect to the relevant pixels being below the negated predefined threshold, this pixel is changed to a second predefined substitute value $L_{min}$.

In this way, on the one hand, the gradient is discretized and, on the other hand, a perturbation to which the relevant areas are subjected for the purpose of the evaluation of the quality function, is made dependent on the direction of the gradient. Substitute values $L_{max}$ and $L_{min}$ for this perturbation may be tailored to the particular application.

In one further particularly advantageous embodiment of the present invention, a statistic is ascertained as to how each pixel of the input image varies over a predefined calibration set of input images, or as to how each pixel of the intermediate product varies when all input images from the calibration set are consecutively supplied to the image classifier. The maximum pixel value of this statistic is established as a first predefined substitute value $L_{max}$ for this pixel. The minimum pixel value of this statistic is established as a second predefined substitute value $L_{min}$ for this pixel. This is an option for adapting the substitute values to the present application.

This may be mapped, for example, in a quality function of the form $$R_{L,f}(m) = f'(H_L \odot m + L \odot (m-1))$$

where $$H_L(\lambda) = L_{min}(\lambda) \text{ when } G_L(\lambda) = -1,$$

$$H_L(\lambda) = L_{max}(\lambda) \text{ when } G_L(\lambda) = 1,$$

$$H_L(\lambda) = L(\lambda) \text{ when } G_L(\lambda) = 0.$$

Quality function $R_{L,f}(m)$ examines perturbations of intermediate product L in accordance with binary mask m. The fact that classification score f is provided with an apostrophe (f') is intended to indicate that the classifier at this point, in contrast to the formula for $R_{L,f}(m)$, is not supplied a modified input image I, but a modified intermediate product L.

$L_{max}$ and $L_{min}$ may alternatively also be replaced with other parameters of the statistic formed via the calibration set, such as the 90th or the 10th percentile.

In one particularly advantageous embodiment of the present invention, a sum of binary masks, which are in each case weighted with the assessments of these binary masks by the quality function, is ascertained as a decision-relevant component of the input image or of the intermediate product. This decision-relevant component S may then be approximated, for example, as $$S_{\{I,L\},f}(\lambda) \approx \frac{1}{E[m] \cdot N} \sum_{i=1}^{N} R_{\{I,L\},f}(m_i) \cdot m_i(\lambda),$$

where $m_i$ is N different binary masks which were drawn from a random distribution, such as for example from a Bernoulli distribution. $E[m_i]$ is the expected value of the distribution from which masks $m_i$ were drawn.

In one particularly advantageous embodiment of the present invention, an image of a series-manufactured product is selected as the input image. The classes of the classification then represent a quality assessment of the product, such as for example "OK," "not OK=NOK," "no decision possible" or also arbitrary levels therebetween. In this connection, in particular, declarations as to why the image classifier assigns an input image to class "NOK" are important. Using such declarations, it is not only possible to improve the image classifier itself, but it is also possible to gain findings about the potential cause of the quality problem, which was set during the manufacturing process. If, for example, a plurality of small localized defects at the product were decisive for the classification as "NOK" and these defects, in turn, are correlated with certain physical conditions during the manufacture of the product (such as for example a high temperature or high pressure), it is possible to deliberately work toward correcting these conditions so that, in the future, a larger percentage of the manufactured product specimens is classified as "OK."

The ascertained components of the input images on which the image classifier bases its decision may, in particular, be compared, for example, to a component of the input image which was ascertained to be relevant for the quality assessment of the product based on an observation of the same product using a different mapping modality. From the result of this comparison, it is then possible to ascertain a quality assessment for the image classifier. For example, hyperparameters of the image classifier may be optimized, with the goal of optimizing this quality assessment.

In one further particularly advantageous embodiment of the present invention, an image of a traffic situation recorded from a vehicle is selected as the input image. The classes of the classification then represent assessments of the traffic situation, on the basis of which the future behavior of the vehicle is planned. In particular, in this field of application, the image classifier and a downstream warning system, driver assistance system or system for at least semi-automatic driving may frequently only be trusted on the condition that the decisions of the image classifier are explainable. The method is able to supply precisely these explanations.

The ascertained components of the input images on which the image classifier bases its decision may, in particular, be compared, for example, to a component of the input image which is known to be relevant for the assessment of the traffic situation. From the result of this comparison, it is then possible to ascertain a quality assessment for the image classifier. Similarly to the application example of the quality control of series-manufactured products, it is then possible, for example, to optimize hyperparameters of the image classifier, with the goal of thereafter better assessing the quality of the image classifier.

The methods may, in particular, be entirely or partially computer-implemented. The present invention thus also relates to a computer program including machine-readable instructions which, when they are executed on one or multiple computer(s), prompt the computer(s) to carry out one of the described methods. Within this meaning, control units for vehicles and embedded systems for technical devices, which are also able to execute machine-readable instructions, are to be regarded as computers.

The present invention also relates to a machine-readable data medium and/or to a download product including the computer program. A download product is a digital product transmittable via a data network, i.e., downloadable by a user of the data network, which may be offered for immediate download in an online shop, for example.

Furthermore, a computer may be equipped with the computer program, with the machine-readable data medium and/or with the download product.

Further measures improving the present invention are disclosed hereafter in greater detail together with the description of the preferred exemplary embodiments of the present invention based on the figures.

DETAILED DESCRIPTION OF EXAMPLE EMBODIMENTS

Figure 1:
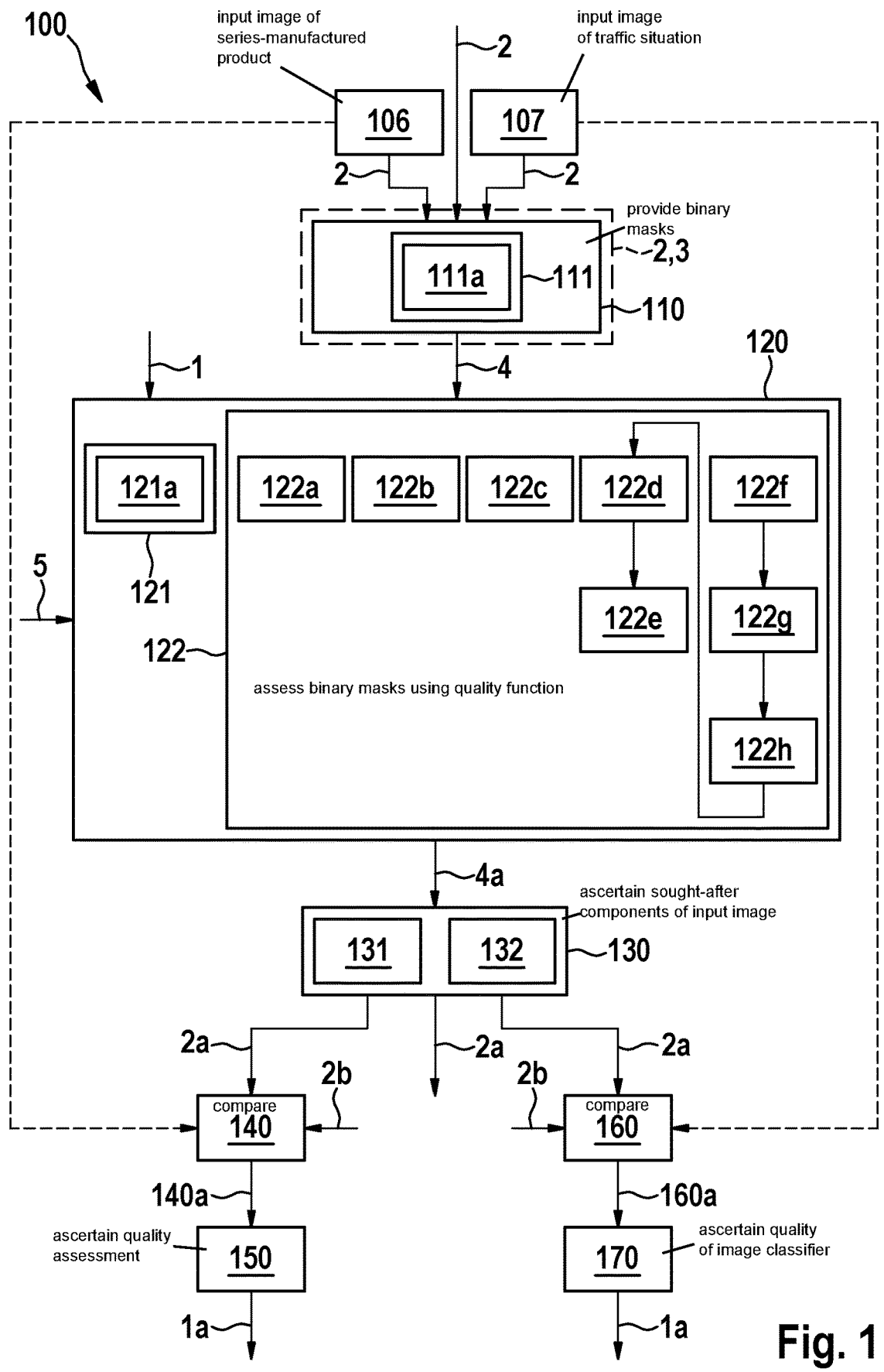
FIG. 1 shows an exemplary embodiment of method 100 of the present invention for measuring components 2a of an input image 2 which are decision-relevant for an image classifier 1.

FIG. 1 is a schematic flowchart of an exemplary embodiment of method 100 for measuring components 2a of an input image 2 on which an image classifier 1 bases its decision regarding the assignment of this input image 2 to one or multiple class(es) of a predefined classification. According to block 106, input image 2 may optionally be an image of a series-manufactured product or, according to block 107, an image of a traffic situation.

In step 110, binary masks 4 are provided, which indicate which pixels of input image 2 and/or of an intermediate product 3 formed in image classifier 1 are considered relevant according to the particular mask 4. These binary masks 4 may be drawn from a random distribution, for example.

In step 120, binary masks 4 are assessed using a quality function 5. This quality function 5 is a measure of the extent to which at least one classification score, supplied by image classifier 1, with respect to at least one target class changes when the pixels of input image 2 or of intermediate product 3 which are relevant according to binary mask 4 are changed. In step 130, the sought-after components 2a of input image 2 relevant for the decision of image classifier 1 are ascertained from the combination of binary masks 4 with their respective assessments 4a by quality function 5.

According to block 111, binary masks 4 may, in particular, refer to an intermediate product 3 which resulted from input image 2 due to processing in one or multiple convolutional layer(s). According to block 111a, this intermediate product may, in particular, be an intermediate product which is mapped on the at least one classification score in image classifier 1 by a classifier layer.

According to block 121, a strong dependence of the at least one classification score on pixels of input image 2 or of intermediate product 3, which according to binary mask 4 are relevant, has an improving effect on the value of quality function 5. According to block 121a, a strong dependence of the at least one classification score on pixels of input image 2 or of intermediate product 3, which according to binary mask 4 are not relevant, may then have a worsening effect on the value of quality function 5.

According to block 122, at least one derivative and/or one gradient of the at least one classification score with respect to the pixels of input image 2 or of intermediate product 3 which are relevant according to binary mask 4 may have an improving effect on the value of quality function 5. According to block 122a, at least one derivative and/or a gradient of the at least one classification score with respect to the pixels of input image 2 or of intermediate product 3 which are not relevant according to binary mask 4 may then have a worsening effect on the value of quality function 5.

According to block 122b, at least one gradient may remain unconsidered in response to its absolute value being below a predefined threshold. As an alternative or also in combination thereto, at least one gradient and/or at least one contribution of a pixel to such a gradient may be discretized according to block 122c in that it, in response to being above a predefined threshold, is set to a first value and in that it, in response to being below the negated predefined threshold, is set to a second value.

For example, the quality function may include at least one classification score which is supplied by the image classifier for a test image generated from the input image or the intermediate product. This test image is changed compared to the input image or the intermediate product for the pixels relevant according to binary mask 4. According to block 122d, in response to a contribution of a pixel to the gradient of the classification score with respect to the relevant pixels being above a predefined threshold, this pixel is changed to a first predefined substitute value $L_{max}$. According to block 122e, in response to a contribution of a pixel to the gradient of the classification score with respect to the relevant pixels being below the negated predefined threshold, this pixel is changed to a second predefined substitute value $L_{min}$.

In particular, a statistic may be ascertained according to block 122f, for example, as to how each pixel of input image 2 or of intermediate product 3 varies over a predefined calibration set of input images 2. According to block 122g, the maximum pixel value of this statistic is then established as a first predefined substitute value $L_{max}$ for this pixel. According to block 122h, the minimum pixel value of this statistic is established as a second predefined substitute value $L_{min}$ for the pixel.

According to block 131, in particular, for example, a sum of binary masks, which are each weighted with the assessments 4a of these binary masks 4 by quality function 5, may be ascertained as decision-relevant component 2a of input image 2 or of intermediate product 3. A decision-relevant component of intermediate product 3 may, regardless of the way in which it was obtained, be converted into the sought-after decision-relevant component 2a of input image 2 by interpolation or other upsampling.

To the extent that decision-relevant components 2a according to block 106 were ascertained based on an input image 2 which shows a series-manufactured product, these components 2a may be compared, in step 140, to a component 2b of the input image which was ascertained to be relevant for the quality assessment of the product based on an observation of the same product using a different mapping modality. From result 140a of this comparison 140, it is then possible, in step 150, to ascertain a quality assessment 1a for image classifier 1.

To the extent that decision-relevant components 2a according to block 107 were ascertained based on an input image 2 which shows a traffic situation, these components 2a may be compared, in step 160, to a component 2b of the input image which is known to be relevant for the assessment of the traffic situation. From result 160a of this comparison 160, it is then possible, in step 170, to ascertain a quality assessment 1a for image classifier 1.

Figure 2:
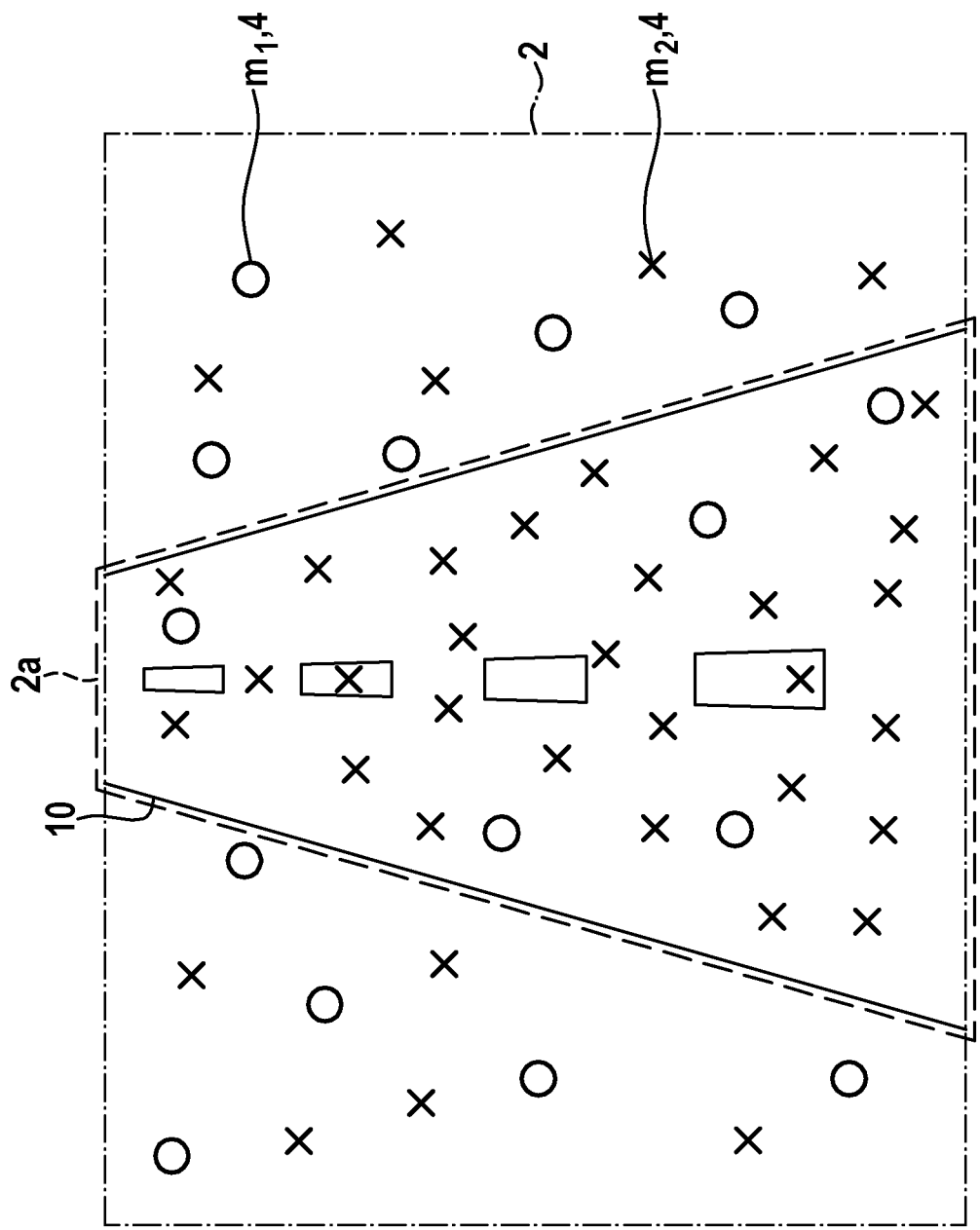
FIG. 2 shows an illustration of two binary masks 4 assessed to varying degrees by a quality function 5 within the scope of method 100 in accordance with an example embodiment of the present invention.

FIG. 2 illustrates two masks $m_1$ and $m_2$, which each indicate which pixels of an input image 2 are to be considered to be relevant. As was explained above, it is particularly advantageous to operate with masks in the space of intermediate products 3 in the latent space; to illustrate the effect, however, masks in the space of input images 2 are more understandable.

Input image 2 shows a road 10, for the recognition of which, image classifier 1 is trained. Mask $m_1$ assesses pixels which are uniformly distributed over the entire input image 2 as relevant. The pixels considered to be relevant according to mask $m_2$, in contrast, are more heavily concentrated in the area of road 10. Mask $m_2$ is assessed better by quality function 5 than mask $m_1$. If many masks 4 are randomly drawn, each is assessed using quality function 5 and aggregated based on assessments 4a obtained in the process, the image area including road 10 emerges as decision-relevant component 2a of input image 2.

What is claimed is:

1. A method for measuring components of an input image on which an image classifier bases its decision regarding an assignment of the input image to one or multiple class(es) of a predefined classification, the method comprising the following steps:
providing binary masks which indicate which pixels of the input image and/or of an intermediate product formed in the image classifier, are considered relevant;
assessing each binary mask of the binary masks using a quality function, which is a measure of an extent to which at least one classification score, supplied by the image classifier, with respect to at least one target class changes when the pixels of the input image or of the intermediate product, which are relevant according to the binary mask, are changed; and
ascertaining sought-after components of the input image relevant for the decision of the image classifier from a combination of the binary masks with their respective assessments by the quality function, wherein at least one derivative and/or one gradient of the at least one classification score with respect to the pixels of the input image or of the intermediate product which are relevant according to the binary mask has an improving effect on a value of the quality function.

2. The method as recited in claim 1, wherein the intermediate product is selected which results from the input image due to processing in one or multiple convolutional layer(s).

3. The method as recited in claim 2, wherein the intermediate product is selected which is mapped on the at least one classification score in the image classifier by a classifier layer.

4. The method as recited in claim 1, wherein a dependence of the at least one classification score on the pixels of the input image or of the intermediate product, which according to the binary mask are relevant, has an improving effect on a value of the quality function.

5. The method as recited in claim 4, wherein a dependence of the at least one classification score on the pixels of the input image or of the intermediate product which according to the binary mask are not relevant has/have a worsening effect on the value of the quality function.

6. The method as recited in claim 1, wherein a derivative and/or a gradient of the at least one classification score with respect to the pixels of the input image or of the intermediate product which are not relevant according to the binary mask has a worsening effect on the value of the quality function.

7. The method as recited in claim 1, wherein at least one gradient remains unconsidered in response to its absolute value being below a predefined threshold.

8. The method as recited in claim 1, wherein at least one gradient and/or at least one contribution of a pixel to the gradient is discretized in that it, in response to being above a predefined threshold, is set to a first value and in that it, in response to being below the predefined threshold negated, is set to a second value.

9. The method as recited in claim 1, wherein the quality function includes at least one classification score which is supplied by the image classifier when the input image or the intermediate product is changed for the pixels relevant according to the binary mask to the effect that,
in response to a contribution of a pixel to the gradient of the classification score with respect to the relevant pixels being above a predefined threshold, the pixel is changed to a first predefined substitute value, and
in response to a contribution of a pixel to the gradient of the classification score with respect to the relevant pixels being below the negated predefined threshold, the pixel is changed to a second predefined substitute value.

10. The method as recited in claim 9, wherein:
a statistic is ascertained as to how each pixel of the input image or of the intermediate product varies over a predefined calibration set of input images;
a maximum pixel value of the statistic is established as the first predefined substitute value for the pixel; and
a minimum pixel value of the statistic is established as the second predefined substitute value for the pixel.

11. The method as recited in claim 1, wherein a sum of the binary masks, which are each weighted with the assessments of the binary masks by the quality function, is ascertained as a decision-relevant component of the input image or of the intermediate product.

12. A method for measuring components of an input image on which an image classifier bases its decision regarding an assignment of the input image to one or multiple class(es) of a predefined classification, the method comprising the following steps:
providing binary masks which indicate which pixels of the input image and/or of an intermediate product formed in the image classifier, are considered relevant;
assessing each binary mask of the binary masks using a quality function, which is a measure of an extent to which at least one classification score, supplied by the image classifier, with respect to at least one target class changes when the pixels of the input image or of the intermediate product, which are relevant according to the binary mask, are changed; and
ascertaining sought-after components of the input image relevant for the decision of the image classifier from a combination of the binary masks with their respective assessments by the quality function, wherein a decision-relevant component of the intermediate product is converted into the sought-after component of the input image by interpolation or other upsampling.

13. A method for measuring components of an input image on which an image classifier bases its decision regarding an assignment of the input image to one or multiple class(es) of a predefined classification, the method comprising the following steps:
providing binary masks which indicate which pixels of the input image and/or of an intermediate product formed in the image classifier, are considered relevant;
assessing each binary mask of the binary masks using a quality function, which is a measure of an extent to which at least one classification score, supplied by the image classifier, with respect to at least one target class changes when the pixels of the input image or of the intermediate product, which are relevant according to the binary mask, are changed; and
ascertaining sought-after components of the input image relevant for the decision of the image classifier from a combination of the binary masks with their respective assessments by the quality function, wherein an image of a series-manufactured product is selected as the input image, and the classes of the classification represent a quality assessment of the product.

14. The method as recited in claim 13, wherein the ascertained sought-after components of the input image on which the image classifier bases its decision are compared to a component of the input image which was ascertained to be relevant for the quality assessment of the product based on an observation of the same product using a different mapping modality, a quality assessment for the image classifier being ascertained from a result of the comparison.

15. A method for measuring components of an input image on which an image classifier bases its decision regarding an assignment of the input image to one or multiple class(es) of a predefined classification, the method comprising the following steps:
providing binary masks which indicate which pixels of the input image and/or of an intermediate product formed in the image classifier, are considered relevant;
assessing each binary mask of the binary masks using a quality function, which is a measure of an extent to which at least one classification score, supplied by the image classifier, with respect to at least one target class changes when the pixels of the input image or of the intermediate product, which are relevant according to the binary mask, are changed; and
ascertaining sought-after components of the input image relevant for the decision of the image classifier from a combination of the binary masks with their respective assessments by the quality function, wherein an image of a traffic situation recorded from a vehicle is selected as the input image, the classes of the classification representing assessments of the traffic situation, based on which a future behavior of the vehicle is planned.

16. The method as recited in claim 15, wherein the ascertained sought-after components of the input image on which the image classifier bases its decision are compared to a component of the input image which is relevant for the assessment of the traffic situation, a quality assessment for the image classifier being ascertained from a result of this comparison.

17. A non-transitory machine-readable data medium on which is stored a computer program including machine-readable instructions for measuring components of an input image on which an image classifier bases its decision regarding an assignment of the input image to one or multiple class(es) of a predefined classification, the machine-readable instructions, when executed by one or more computers, causing the one or more computers to perform the following steps:
providing binary masks which indicate which pixels of the input image and/or of an intermediate product formed in the image classifier, are considered relevant;
assessing each binary mask of the binary masks using a quality function, which is a measure of an extent to which at least one classification score, supplied by the image classifier, with respect to at least one target class changes when the pixels of the input image or of the intermediate product, which are relevant according to the binary mask, are changed; and
ascertaining sought-after components of the input image relevant for the decision of the image classifier from a combination of the binary masks with their respective assessments by the quality function, wherein at least one derivative and/or one gradient of the at least one classification score with respect to the pixels of the input image or of the intermediate product which are relevant according to the binary mask has an improving effect on a value of the quality function.

18. A computer configured to measure components of an input image on which an image classifier bases its decision regarding an assignment of the input image to one or multiple class(es) of a predefined classification, the computer configured to:
provide binary masks which indicate which pixels of the input image and/or of an intermediate product formed in the image classifier, are considered relevant;
assess each binary mask of the binary masks using a quality function, which is a measure of an extent to which at least one classification score, supplied by the image classifier, with respect to at least one target class changes when the pixels of the input image or of the intermediate product, which are relevant according to the binary mask, are changed; and
ascertain sought-after components of the input image relevant for the decision of the image classifier from a combination of the binary masks with their respective assessments by the quality function, wherein at least one derivative and/or one gradient of the at least one classification score with respect to the pixels of the input image or of the intermediate product which are relevant according to the binary mask has an improving effect on a value of the quality function.

* * * * *